Dec. 16, 1930.   G. SUNDBACK   1,785,234
SEPARABLE FASTENER
Filed Feb. 14, 1925   3 Sheets-Sheet 1
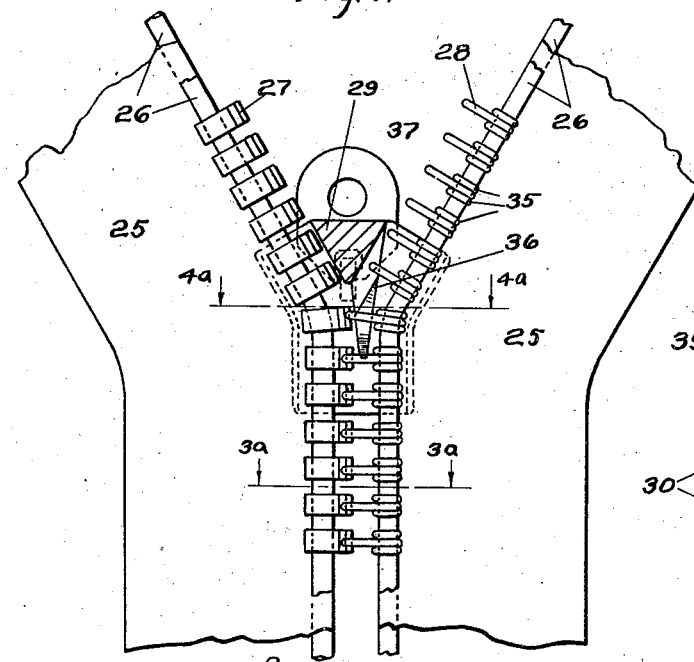
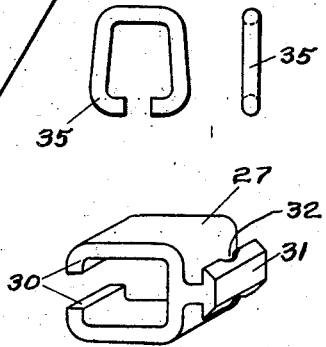
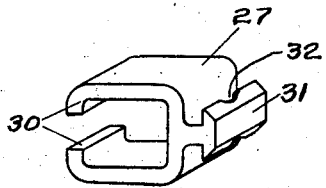
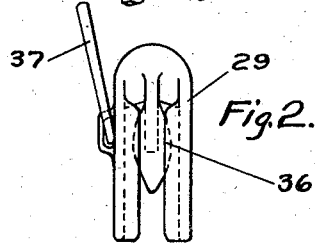
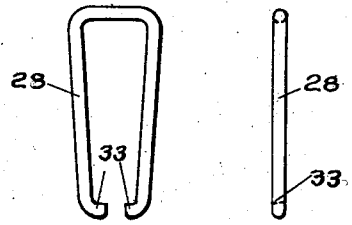
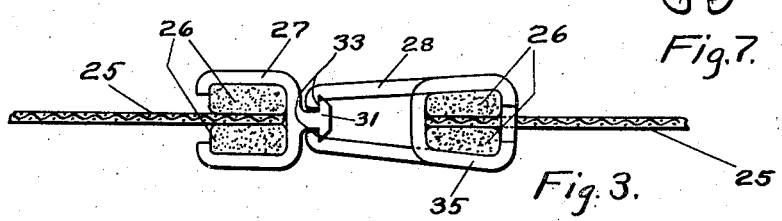
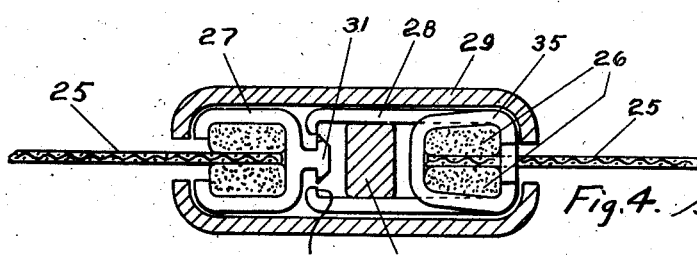
INVENTOR
Gideon Sundback
BY
ATTORNEY Dec. 16, 1930. G. SUNDBACK 1,785,234
SEPARABLE FASTENER
Filed Feb. 14, 1925 3 Sheets-Sheet 2
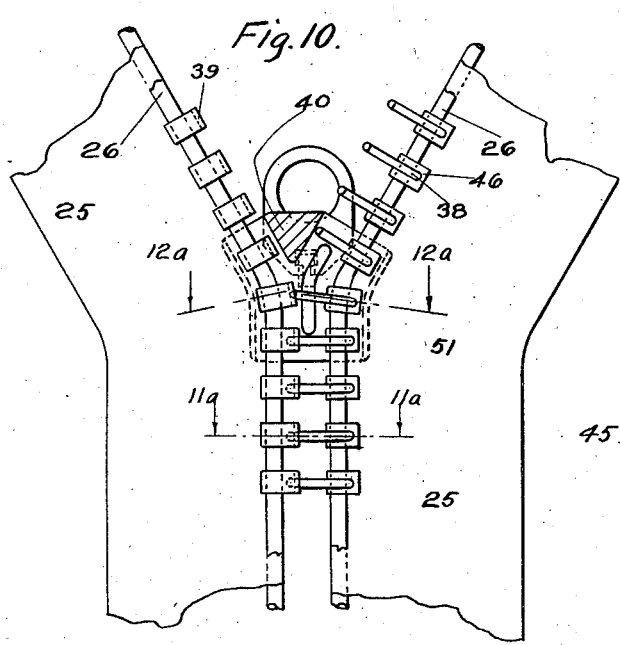
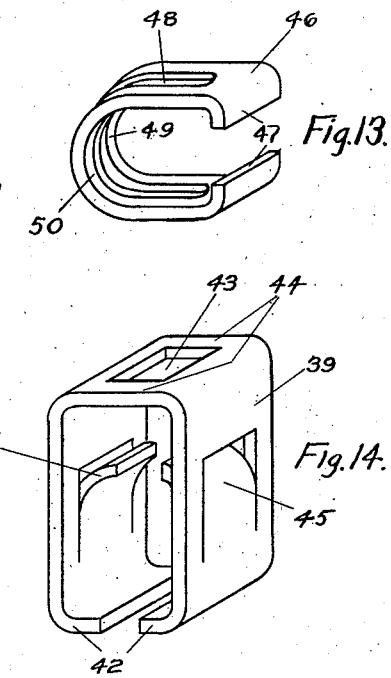
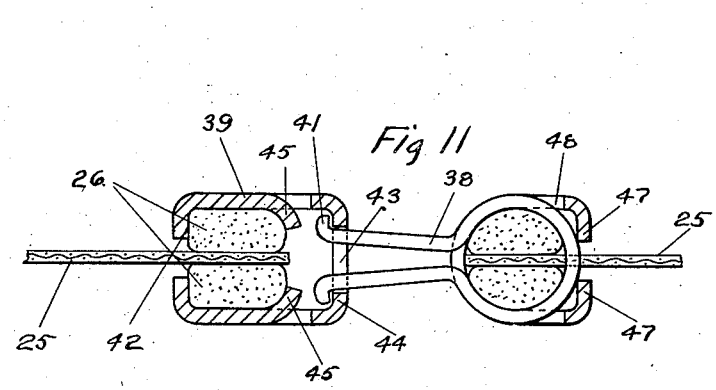
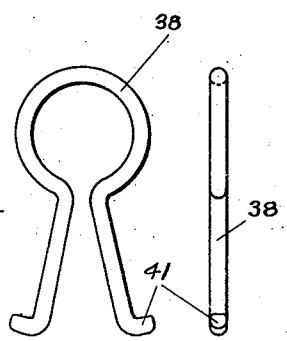
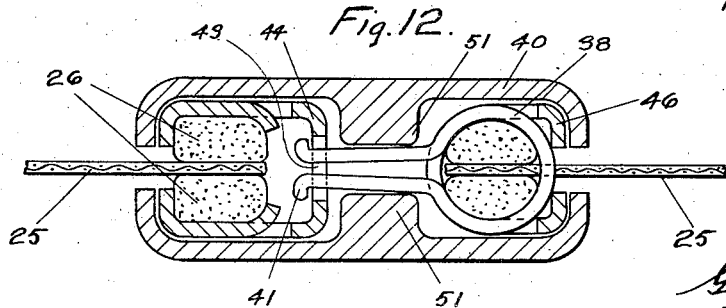
INVENTOR
Gideon Sundback
BY
J. O. Wooster
ATTORNEY Dec. 16, 1930.                G. SUNDBACK                1,785,234
                            SEPARABLE FASTENER
                          Filed Feb. 14, 1925          3 Sheets-Sheet 3
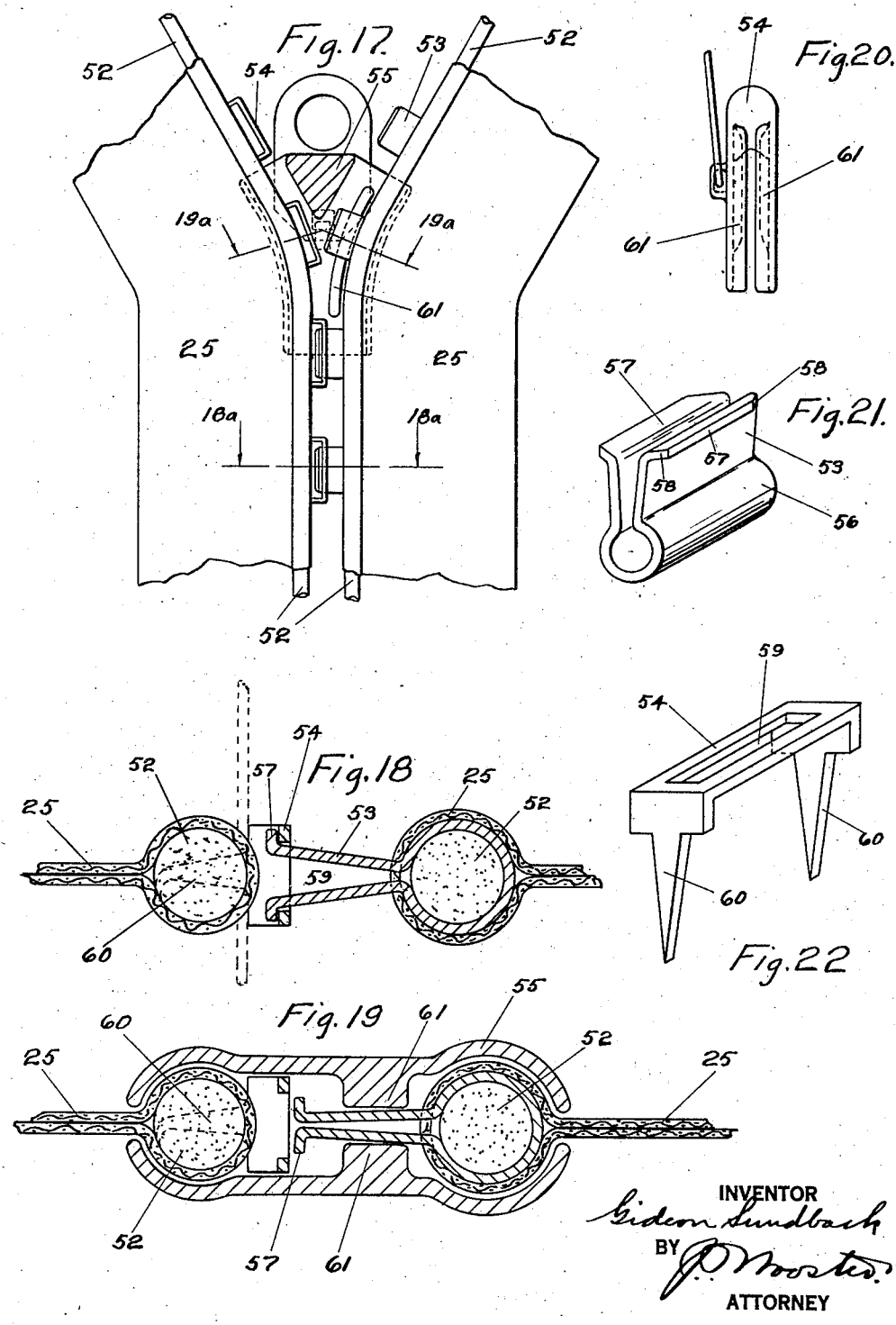
INVENTOR
Gideon Sundback
BY
ATTORNEY Patented Dec. 16, 1930

1,785,234

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

SEPARABLE FASTENER

Application filed February 14, 1925. Serial No. 9,087.

This invention relates to separable fasteners of the slider controlled type and has for its object to provide such device which is flexible, yet which will not become accidentally unfastened. Another object is to provide a fastener which will not come unfastened under tension on the stringers in any direction.

One form of slide type fastener comprises resilient locking members arranged to be spread by cam surfaces in the slider to engage or disengage the edge of the opposite stringer. These are open to the objection of being likely to come unfastened due to the resilient locking members spreading under a transverse stress.

According to this invention, a fastener is provided having locking members capable of being deformed by cam surfaces in the slider for cooperation with locking members on the opposite stringer arranged in such way that the two members cannot be disengaged under tensional stress in any direction. Resilient clips are secured to one stringer and complementary locking members secured to the opposite stringer, the ends of the resilient clips being bent at substantially right angles so that they may be securely engaged within or around the opposite locking member and cannot become accidentally unfastened under stress.

In the accompanying drawings:

Figure 1 shows one form of new fastener partly opened and partly closed,

Fig. 2 illustrates the slider actuating the locking members of Fig. 1,

Fig. 3 is a section on the line 3a—3a of Fig. 1,

Fig. 4 is a section on the line 4a—4a of Fig. 1,

Fig. 5 is a detail of one of the securing members,

Fig. 6 is a side view of the device of Fig. 5,

Fig. 7 shows one of the clip locking members,

Fig. 8 is a side view of the device of Fig. 7,

Fig. 9 is a perspective of another locking member on the opposite stringer from that of the member shown in Figs. 7 and 8, Fig. 10 illustrates another embodiment of this invention, Fig. 11 is a section on the line 11a—11a of Fig. 10, Fig. 12 is a section on the line 12a—12a of Fig. 10, Fig. 13 is a perspective of one of the retaining members for the resilient clips, Fig. 14 is a perspective of the locking members located on the left hand stringer of Fig. 10, Fig. 15 is a plan view of one of the spring clips, Fig. 16 is a side view of the device of Fig. 15, Fig. 17 illustrates still another embodiment of this invention, Fig. 18 is a section on the line 18a—18a of Fig. 17, Fig. 19 is a section on the line 19a—19a of Fig. 17, Fig. 20 is a side view of the slider shown in Fig. 17, Fig. 21 is a perspective of one of the spring clip members, and Fig. 22 is a perspective of one of the locking members on the left hand stringer of Fig. 17.

Referring to the embodiment of the invention illustrated in Figs. 1–9, inclusive, the fastener comprises stringers of flexible tape 25 along the edges of which are sewed cords 26, the locking members being clamped to the corded edge of the tape. Along one stringer are fastened the spring clips 28 which engage the locking members 27 of the opposite stringer and are controlled by the slider 29. The locking member illustrated in Fig. 9 is secured to the left stringer of Fig. 1 by means of compressible jaws 30. On the longitudinal edge of this locking member is provided a projection 31 having flanges extending transversely in the manner indicated and forming a T-shaped projection. To retain the yieldable clips 28 in position, the flanges of the projection 31 may be recessed as illustrated at 32. The locking members on the opposite stringer comprise yieldable clips 28 which are bent around the corded edge, passed through the tape 25, and are clamped onto said corded edge. Either side of the spring clip or both together may be regarded as a yieldable projection. The ends 33 of the clips are bent at substantially right angles so as to provide surfaces to engage the back of the flanges of projection 31 and firmly retain the members locked so that they will not come apart under a transverse stress. To firmly position the locking members 28 upon the corded edge there are provided compressible jaw members 35 securely clamped to the corded edge above and below the locking member 28, as illustrated in Figs. 1, and 3–6, inclusive. Within the slider 29 and projecting from the reinforced portion between the diverging channels are located the cam surfaces 36 which are shaped to spread the spring clips for engagement with the opposite locking member. A pull device 37 is preferably located adjacent the longitudinal and transverse center of the slider for moving it either way.

In Fig. 10 is illustrated another form of this invention in which the spring clips are compressible for engagement with the opposite locking member. Here again, each of the locking members 38 and 39 are secured to the corded edges 26 of tape stringers 25 and the engagement of these members controlled by the slider 40. From Figs. 11, 12, 15 and 16 it will be seen that each spring slip locking member 38 is shaped as illustrated to be clamped to the corded edge and to pass through the tape 25. Each clip 38 has a pair of projecting spring arms whose outer ends 41 are bent at substantially right angles and in an outward direction since the clip is compressible for engagement with the recess 43 in the opposite locking member 39. To help retain the spring clips 38 in proper alignment, an additional securing or bracing means 46, illustrated in Fig. 13, is used, which comprises compressible jaws 47 for clamping the same upon the corded edge. The portion of the member 46 between the jaws is recessed at 48 to provide a space through which the compressible portions of the spring clip locking member 38 may project and on either side of the recess 48 are portions 49 and 50, which engage the locking member 38 and help keep the compressible projection portion of the locking member at substantially a right angle to the corded edge. The opposite locking members 39 comprise compressible jaws 42 for clamping the member around the corded edge, as illustrated in Figs. 11 and 12. At the opposite end of this locking member is provided a recess 43, closed on all sides of the metal 44 so that when the expansible projection of the opposite locking member is once engaged its ends 41 will not come out of the recess in any direction. The longitudinal sides of said recess form flanges on the body sides. Stamped and bent tongues 45 in the sides of the locking member 39 engage the corded edge and enable it to be compressed and the locking member securely clamped in position. Instead of wedge shaped cam surfaces which spread the spring clips of the locking member as in the previous modification, this embodiment includes cam surfaces 51 within the slider, as illustrated in Figs. 10 and 12 for the purpose of compressing the spring clips or projection portions for engagement with the recess 43 of the locking member 39.

In Fig. 17 is illustrated yet another embodiment in which the cord 52 on the edge of the tape 25 is enclosed beneath the metal by the stringer or tape, preferably after the locking members have been clamped in position so that less metal parts are exposed and the track of the slider is of woven material instead of metal. The locking member 53 is the expansible clip type for cooperation with the recess 59 of the opposite locking member 54 and the engagement between these members is controlled by the slider 55. As shown in Fig. 21, the locking member 53 comprises a tubular portion 56 which is compressible around the cord 52 and the expansible projections have their ends 57 bent outwardly at substantially a right angle as illustrated. To facilitate entry of the spring clip and its ends 57 into the slider channels, the ends may be bevelled at 58 as illustrated. The fabric of the tape or stringer 25 is perforated to allow the compressible projection portion of the locking member to extend therethrough as illustrated in Figs. 18 and 19. After the locking member 53 is in position on the cord 52 the stringer fabric 25 may then be sewed in place. On the opposite stringer, the locking member 54 is secured to the stringer by means of the prongs 60 extending into the cord 52 and bent over as shown in dotted lines in Figs. 18 and 19 for the purpose of securing this locking member in place. After the ends of the prongs have been bent over, as illustrated, the stringer fabric 25 may then be sewed together as illustrated at the left side of Fig. 18. At the time the prongs 60 are inserted into the cord 52, the woven fabric may be secured to the cord or may be positioned relatively to the cord, as shown in dotted lines in Fig. 18, this material being brought around to enclose the cord 52 after the ends of the prongs 60 have been bent. The slider 55 is provided with cam surfaces 61 for compressing the projection portion of the locking member 53 during its engagement with the recess of the member 54. With movement of the slider in the opposite direction to open the fastener, the spring clips are compressed by the cam surfaces and then the diverging channels of the slider cause the two locking members to be disengaged.

In each embodiment of this invention the ends of the spring clips are bent to form a substantial right angle so that the locking members will not become unfastened under a severe transverse tension, but are enabled to firmly hold because the force will be substantially normal to the contact surfaces between the two locking members, that is, between the surface formed by one side of the bent ends of the spring clip and by the cooperating surface of the opposite locking member engaged by these bent ends. The ends of the spring clips may also be bent slightly more than 90° if desired in order to more firmly retain the locking members engaged, but the angle should be only a small amount over 90° due to the bent ends of the spring clips moving through an arc in being engaged or disengaged with the opposite locking member. If the projection portion of the spring clip locking members were shorter and the arc of travel of their bent ends greater, the bend at the ends could be slightly increased. The recessed form of locking member being enclosed prevents the spring clips from sliding out of position due to any longitudinal or other displacement between the stringers. The embodiment illustrated in Fig. 1 has the notched portion 32 to help retain the expansible ends of the spring clip locking member in position and prevent longitudinal movement between the stringers from unfastening the members.

Among the advantages of this invention may be enumerated the increased flexibility of the fastener which may be greater or less, according to the spacing between locking members on the same stringer. The spacing between the locking members also controls the cost of this fastener since the use of a minimum number of locking members per unit length produces a less expensive fastener. Another advantage resides in the spring clip type of locking member being securely fastened to its opposite locking member and not capable of being disengaged under severe transverse strain, or, in fact, disengaged by a strain in any direction, or by relative movement between the stringers. While not necessary, it is preferred that the ends of the spring clips be bent to form a substantial right angle in order to better withstand transverse tension tending to separate the stringers, since if the bend were less than a right angle the force would be separated into components tending to compress or expand the spring clip projection members and might result in the disengagement of the locking members. The additional securing means shown in Figs. 5 and 6 of the first modification, or Fig. 13 of the second modification, helps retain the yieldable ends of the spring clip locking member in their correct position for proper engagement with the opposite locking member and prevents the yieldable ends from being moved out of place. A further advantage in this fastener resides in the locking members being made of either sheet or wire stock, which is adapted for fabrication by automatic machines. The cam surfaces within the slider, whether for spreading or compressing the spring clips, should be sufficiently gradual to enable the locking members to move smoothly through the slider and should preferably be of about the shape illustrated.

The embodiment of the invention disclosed in Figs. 1 to 9 forms the subject matter of divisional application Serial No. 260,493, filed March 9, 1928.

I claim:

1. A slide type fastener comprising a pair of stringers having a plurality of pairs of opposed locking members, one member of each pair having a recess and the other member of each pair having resilient projections flexed to grip opposite edges of said recess.

2. A slide type fastener comprising a pair of stringers having a plurality of pairs of opposed locking members, one member of each pair having a resilient projection and the other member of each pair having means shaped to retain such projection, and a slider controlling the engagement of said members having a cam surface acting directly on said projection transversely to the plane of said stringers to flex said projection into position for engagement with said retaining means.

3. A slide type fastener comprising a pair of flexible stringers, locking members on one stringer provided with yieldable portions normally sprung apart, cooperating members on the opposite stringer being provided with means shaped to engage and retain said first mentioned locking members yieldable portions in engagement, and a slider controlling the engagement of said means with the yieldable portions of said locking members, said slider having cam surfaces for compressing said yieldable portions toward each other when moved longitudinally along said stringers to engage and disengage said members.

4. A slide type fastener comprising a pair of flexible stringers, locking members on one stringer provided with yieldable portions, cooperating members on the opposite stringer being provided with means shaped to engage and retain said first mentioned locking members yieldable portions in engagement, and a slider controlling the engagement of said means with the yieldable portions of said locking members, said slider having cam surfaces which act directly on said yieldable portions in the direction of their yielding movement to distort said yieldable portion to engage and disengage said members when the slider is moved longitudinally along said stringers.

5. A slide type fastener comprising a pair of flexible stringers, locking members on one stringer each being provided with a resilient projection, cooperating members on the opposite stringer each being provided with a recess shaped to receive the projection of the opposite member and retain the same against longitudinal movement, and a slider having means acting directly on said projection in the direction of its resilient action to deform said projection sufficiently to permit engagement and disengagement from said recess.

6. A separable fastener having cooperating pairs of locking members, one member of each pair having yieldable portions normally held apart and adapted when compressed toward each other to be free to move into and out of engagement with the other member of the pair, and a slider having cam surfaces for compressing said yieldable portions when moved longitudinally along the fastener.

7. A slide type fastener comprising a pair of flexible stringers, recessed locking members on one stringer, and locking members on the opposite stringer each provided with resilient projections flexed outwardly to engage the respective opposite edges of a single recess in one of said first mentioned locking members.

8. A locking member for a slide type fastener comprising a bent wire projection member clamped to a tape, additional means longitudinally on each side of said wire member for retaining the same in position, said means comprising a sheet metal U-shaped member perforated to receive the projecting portion of the wire member, and having inturned edges for clamping the same to the corded edge of a tape.

9. A locking member for a slide type fastener comprising a U-shaped member having inturned edges at one extreme end of such member for clamping one side of the corded edge of a stringer and having tongues spaced from said end and bent around the opposite side of said corded edge, the ends of said tongues projecting free of the body portion of said member, and an interlocking portion for cooperation with locking means on an opposite stringer.

10. A slide type fastener comprising a pair of flexible stringers, a plurality of locking members on the longitudinal edge of one stringer having recesses disposed in a plane transverse to that of said stringer, and a plurality of locking members on the longitudinal edge of the other stringer each having resilient projections normally flexed outwardly in opposite directions to grip opposite sides of a single recess in a cooperating member.

11. A slide type fastener comprising a pair of flexible stringers, a plurality of locking members having engageable portions mounted on the longitudinal edge of one stringer, and a plurality of spring clips each having a pair of spring arms mounted on the longitudinal edge of the other stringer, said spring arms of each pair normally being flexed outwardly from each other to grip the engageable portions of said locking members and adapted to be sprung toward each other to effect disengagement.

12. A locking member for a slide type fastener comprising a bent wire projection member clamped to a tape, and means longitudinally on each side of said wire member for retaining the same in position longitudinally, said means comprising a separate jaw member clamped to the tape with portions on each side longitudinally of the wire member.

13. A slide type fastener comprising a pair of flexible stringers, a plurality of locking members on one stringer, a plurality of spring clips on the other stringer flexed so that they will not normally move into interlocking engagement with said locking members, and a slider having a cam surface acting transversely to the plane of said stringers and directly on said spring clips to distort said spring clips from their normal position to permit their moving into engagement with said locking members.

14. A locking member for a slide type fastener comprising compressible jaws for clamping against the inner side of the corded edge of a tape, compressible tongues cut out of the body of said member for clamping against the outer side of said corded edge, and a portion spaced from the edge of the tape and shaped for engagement with a locking member on an opposite tape.

15. A slide type fastener comprising a pair of flexible stringers having a plurality of pairs of cooperating locking members, one member of each pair having yieldable projections flexible inwardly and outwardly from each other and the other member of each pair having opposite edges, said projections being brought directly into interlocking engagement with said edges when normally flexed outwardly from each other.

16. A locking member for a slide type fastener comprising an interlocking portion shaped to engage a locking member on an opposite stringer, means for clamping said member to a tape, and a separate bracing member engaging said locking member longitudinally on each side to retain the same in position.

17. A slide type fastener comprising a pair of flexible stringers, a plurality of locking members having recesses on the longitudinal edge of one stringer, a plurality of spring clips on the longitudinal edge of the other stringer flexed outwardly in opposite directions so that they will not normally enter the recesses of said locking members, and a slider having a cam surface shaped to compress said spring clips to engage them with said recesses.

18. A slide type fastener comprising flexible stringers, locking members secured to one stringer and having yieldable jaws extending outward for engagement with cooperating members on the other stringer, the ends of said jaws being bent to at least a right angle, the portions of the cooperating members engaged by the bent ends of said jaws being substantially parallel to said bent jaw ends, and a slider having laterally diverging channels for controlling the engagement of said locking members and cooperating members on the opposite stringer.

19. A slide type fastener comprising a pair of flexible stringers having corded edges, a plurality of locking members on the corded edge of one stringer, and a plurality of spring clips looped over the corded edge of the opposite stringer and having projecting portions normally flexed outwardly to maintain them in engagement with the locking members on said first mentioned stringer.

20. A locking member for a slide type fastener comprising a U-shaped sheet metal member having inturned edges for clamping one side of the corded edge of a stringer and having ears bent around the opposite side of said corded edge, and a recess in said member in a plane normal to said corded edge.

21. A slide fastener comprising a pair of flexible stringers, and a series of locking members on each of said stringers, each of the members of one series having a pair of resilient arms projecting laterally of the stringer, the free ends of said arms being bent in different directions away from each other to provide interlocking means for engagement with the members of the other series.

Signed at New York city in the county of New York and State of New York this 30th day of January, A. D. 1925.

GIDEON SUNDBACK.